3,070,567
ORGANOPOLYSILOXANE MASSES THAT CAN BE CURED TO OBTAIN SELF-ADHERING ELASTOMERS

Siegfried Nitzsche and Manfred Wick, both of Burghausen, Upper Bavaria, Germany, assignors to Wacker-Chemie G.m.b.H., Bavaria, Germany
No Drawing. Filed May 1, 1961, Ser. No. 106,467
Claims priority, application Germany May 13, 1960
3 Claims. (Cl. 260—37)

This invention relates to novel silicone elastomers and more particularly to silicone rubber stocks hardenable to self-adhering elastomers.

The use of silicone rubber in the form of tapes, sheets, as dispersions in organic solvents and in other forms, as coatings on electrical conductors, organic synthetic materials, wood, leather, textile surfaces and so forth has long been known. Recently, self-adherent silicone rubber tapes have been developed. These tapes are particularly useful as electrical and thermal insulation. The elastomeric material employed in such tapes is also useful in preparing laminates of glass cloth, etc. These recently developed silicone rubber stocks are characterized in U.S. application Serial Nos. 6,871 and 6,872, filed February 5, 1960; application Serial No. 9,428, filed February 18, 1960; and in French Patent No. 1,204,897, issued August 10, 1959, and Canadian Patent No. 588,913, issued December 15, 1959.

Adhesive silicone rubber tapes, based on diorganopolysiloxanes, have been prepared by applying the siloxane polymer to a flexible backing material such as glass cloth. The siloxane polymers have been applied by rolling, coating, immersing, calendering or any other desired means and are then partially vulcanized. The partial vulcanization produced a tackiness such that some adhesion between the tape and other materials was achieved (see U.S. Patents No. 2,708,289, No. 2,831,611 and No. 2,814,601). However, the tapes prepared by such methods had relatively short shelf life. The residual tackiness would be lost after a few weeks of storage at room temperature. Furthermore, such tapes required a carrier or backing material hence had limited capacity for stretching or application under stress. In addition, prior to vulcanization the insulating tapes so prepared exhibited poor adhesion to organosiloxane elastomers, organic synthetic solid materials (e.g. "plastics"), textile and leather.

The self-adhering silicone rubber tapes as developed are based on mixtures of diorganosiloxane polymeric gums, alkyl borates or other similar boron compounds, with or without hydroxyl- and/or alkoxyl containing silicon compounds, fillers and vulcanizing agents. These materials resemble the so-called "bouncing putties" as disclosed in U.S. Patents Nos. 2,431,878 and 2,541,851 as well as certain known silicone rubber formulations such as disclosed in U.S. Patent No. 2,721,857. However, the bouncing putty is actually a fluid material subject to flow and it exhibits neither cohesion when flexed nor elasticity when stress is applied slowly. The rubber formulations of U.S. Patent No. 2,721,857 do not exhibit the desired self-adherence.

The discovery of self-adhering silicone rubber tapes was quite surprising in view of the adjacent art. Such tapes have, however, suffered several commercial drawbacks. In the first place, the self-adhering tapes based on diorganosiloxane polymer and alkyl borate, required interleaving during storage. If one prepares self-adhering tape and stores it in a roll in the usual fashion for storing tapes, one finds the self-adhesion properties are as active in storage as in use and the roll soon becomes a useless unitary mass with each layer of tape firmly bonded to the preceding layer and the succedent layer. As can be readily seen the use of an interleaving sheet in such tapes is absolutely necessary and the interleaving sheet must be removed and disposed of during application of the tape. This is both time consuming and burdensome and reduces the potential use of the self-adhering silicone rubber tapes.

It is the object of this invention to produce a novel self-adhering silicone rubber tape which can be stored in rolls without interleaving and without adhesion between adjacent layers of tape in the roll and thereafter when the tape is in place it can be made to self-adhere. A novel method of preparing laminates is also an object of this invention. Other objects and advantages of this invention are detailed in or will be apparent from this disclosure and the appended claims.

This invention consists of a silicone rubber stock consisting essentially of 100 parts by weight of a diorganosiloxane polymer, 0.1 to 10 parts by weight of a complex compound of boric acid and a polyhydric alcohol, and, if desired, a filler.

The diorganosiloxane polymers employed herein are essentially linear polymers of the unit formula

where $n$ has an average value of 1.99 to 2.01 and each R is a monovalent hydrocarbon radical or a halogenated monovalent hydrocarbon radical. In these polymers the great bulk (i.e. 98 mol percent) of the units are $R_2SiO$ units but limited amounts (i.e. up to 1 mol percent, preferably less than 0.1 mol percent) of $RSiO_{3/2}$ units and $R_3SiO_{1/2}$ units can be present. These linear polymers can be endblocked with —OH, —OR, R, H, halogen atoms and other monovalent atoms or groups.

The operative siloxane polymers can be homopolymers wherein all of the units are similarly substituted as in a dimethylsiloxane polymer, a phenylmethylsiloxane polymer and a 3,3,3-trifluoropropylmethylsiloxane polymer. Copolymers wherein the individual units differ such as a copolymer of 0.2 mol percent vinyldimethylsiloxane units, 92 mol percent dimethylsiloxane units and 7.8 mol percent phenylmethylsiloxane units are also operative. These polymers range from fluids of viscosities as low as 50,000 cs. at 25° C. to benzene soluble polymeric gums with viscosities measured in millions of centistokes.

The organic substituents bonded by C—Si bonding to the silicon atoms in the base siloxane polymers are represented by R and can be any monovalent hydrocarbon radical or any halogenated monovalent hydrocarbon radical. The radicals represented by R can be alkyl radicals such as methyl, ethyl, propyl, butyl, hexyl, octyl and octadecyl; aryl radicals such as phenyl, diphenyl and anthracyl; alkaryl radicals such as tolyl, xylyl, ethylphenyl and methylnaphthyl; aralkyl radicals such as benzyl and phenylethyl; cycloaliphatic radicals such as cyclopropyl, cyclobutyl, cyclopentenyl, cyclohexyl and cyclopentyl; alkenyl radicals such as vinyl, allyl, methallyl and octadecenyl and halogenated derivatives of said radicals such as trichloromethyl, perfluoroethyl, 3,3,3-trifluoropropyl, bromophenyl, iodoanthracyl, α,α,α-trichlorotolyl, bromobenzyl, chlorofluoroethylphenyl, trichlorofluorovinyl, and $C_xF_{2x+1}CH_2CH_2$— where $x$ is 1 to 10.

The boric acid-polyhydric alcohol complex is prepared according to known methods. The boric acid is treated with a polyhydric alcohol such as glycerine, pentaerythritol, ethylene glycol, propylene glycol and so forth. When the boric acid is mixed with the polyhydric alcohol, the complex forms and is presumably of the formula:

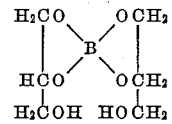

These complexes are disclosed and discussed in the following references: Boeseken, Berichte der Deutsche Chemischen Gesellschaft, Band 46, Seite 2612 ff. (1913); Recueil des Travaux Chimiques des Pays-Bas, vol. 40, p. 354 (1921). It is not necessary to isolate the complex. A saturated solution of boric acid in polyhydric alcohol is operative. The boric acid-polyhydric alcohol complex is employed in proportions of from 0.1 to 10 parts by weight per 100 parts diorganosiloxane polymer present. The best results are achieved with from 2 to 10 parts by weight of the complex on the stated basis.

In addition to the diorganosiloxane polymer and boric acid-polyhydric alcohol complex, the silicone rubber stock can contain a finely divided filler. Suitable fillers are $TiO_2$, zinc oxide, diatomaceous earth, ground quartz, silica aerogels, silica xerogels, fume silica, carbon blacks, argillaceous earth, glass fibers, glass frit, clay, iron oxide, cork, dust, powdered organic resins, polytetrafluoroethylene, polychlorotrifluoroethylene and copper phthalocyanine. These fillers, and particularly reinforcing silica fillers such as fume silica, can be surface-modified with organosilicon compounds to display organosilyl groups bonded to the filler surface by Si—O bonds. The filler can be employed in quantities of from 10 to 200 parts filler per 100 parts by weight diorganosiloxane polymer but the normal filler loading is 20 to 100 parts by weight per 100 parts of said polymer.

The silicone rubber stock can be vulcanized by any desired means. The vulcanization can be carried forward employing high energy radiation such as supplied by a Van de Graaff particle accelerator, a cobalt 60 source, and other known high energy ionizing radiation sources. More commonly the stock is vulcanized by including in the stock 0.1 to 10 parts by weight per 100 parts organosiloxane polymer, of an organic peroxide such as benzoyl peroxide, dichlorobenzoyl peroxide, monochlorobenzoyl peroxide, ditertiary butyl peroxide, dicumyl peroxide, tertiary butyl perbenzoate, cumyl-tertiarybutyl peroxide, and so forth. The stocks containing peroxide must be heated to above the activation temperature of the peroxide to effect vulcanization.

A further method of vulcanization is widely known as room temperature vulcanization or RTV. The RTV stocks contain (1) a cross-linking agent selected from di- or polyfunctional silicon compounds or polymers such as alkyl silicates, alkyl polysilicates and alkylhydrogen-siloxanes such as $(R'HSiO)_n$ where $R'$ is alkyl and $n$ is 3 to 50 and (2) a cross-linking catalyst consisting of a metal salt of a carboxylic acid wherein the metal ion is selected from Pb, Sn, Ni, Co, Fe, Cd, Cr, Zn, Mn, Zr, Sb, Ba, Ca, Ti and Bi. Typical salts are lead octoate, dialkyltindiacylates such as dibutyl tin dilaurate, tin octoate, iron naphthenate and so forth. This vulcanizing system is fully disclosed in U.S. patent application Serial No. 602,081, filed August 3, 1956.

The stocks of this invention can also contain conventional quantities of pigments, plasticizers, heat stability additives such as metal oxides and additives designed to improve specific physical properties such as tear strength and compression set.

Particularly useful as additives are silanes and siloxanes containing hydroxyl groups bonded to silicon. Such materials as diphenylsilanediol and other silane diols as well as hydroxyl endblocked diorganosiloxane fluids of low viscosity (i.e. less than 50,000 cs. at 25° C.). These hydroxylsilicon materials serve to prevent crepe aging in silicone rubber stocks containing reinforcing silica. Another useful additive is an alkoxylated silicon composition which serves to dilute the stock and retard curing in some applications.

The silicone rubber stock is prepared by mixing in any desired manner but conventionally on a roll mill or in a commercial mixer the organosiloxane polymer, boric acid-polyhydric alcohol complex, filler, if desired, and vulcanizing agent, if any. Other additives may be milled in as desired or required. It is often desirable to add the boric acid-polyhydric alcohol complex in the form of a saturated solution of boric acid in polyhydric alcohol, admixed to form a paste with fume silica or other filler.

The silicone rubber stock can be stored in watertight containers for long periods of time without serious deterioration. The stock can be pressed, molded, extruded or otherwise formed into the desired shape or configuration. Thereafter the stock is vulcanized according to standard procedures employed for self-adhering silicone rubber. Generally, the vulcanization is carried forward at high temperature for a short period of time. After vulcanization, the rubber can be stored at room temperature in rolls or layers without interleaving sheets. Tapes so prepared and stored can be applied to electrical conductors and the self-adhesion properties can be obtained by heating to 60° C. or more.

The stocks of this invention can also be employed as bonding agents between metals and boron-free silicone rubbers. Employing the stocks of this invention as interlayers bonding silicone rubber to metals, one obtains excellent bonding at low pressures and extraordinary mechanical stability in the bond. A particularly useful embodiment comprises coating the metal with ethyl polysilicate, applying to the ethyl polysilicate coating a layer of a silicone rubber stock according to this invention and thereafter applying the layer of boron-free silicone rubber. The entire mass is heated under low pressure to achieve the desired bonding.

Furthermore, the silicone rubber stocks of this invention have been found to be very useful in bonding together layers of silicone rubber and in the repair of cuts, holes and other damaged spots in vulcanized silicone rubber pieces. Vulcanized silicone rubber can be formed into laminates by bonding sheets of such rubber with interlayers of the silicone rubber of this invention. The laminating step is accomplished under low pressure and temperature exceeding 60° C. Cuts and damaged areas found in silicone rubber materials, particularly silicone rubber insulation, can be repaired with the stocks of this invention. The silicone rubber stock according to this invention can be used to patch cuts and damaged areas. Again vulcanization should be carried out under light pressure.

The silicone rubber stocks of this invention are widely useful in the applications known for silicone rubber such as tapes employed as electrical insulation.

The following examples are offered to aid those skilled in the art in understanding and practicing this invention. The scope of the invention is delineated in the claims and is not limited by the examples. All parts and percentages in the examples are based on weight unless otherwise specified.

*Example 1*

A paste was prepared by mixing 10 parts boric acid, 100 parts glycerine and 10 parts fume silica. This paste was employed in preparing a silicone rubber stock by milling 100 parts of a diorganosiloxane copolymer gum of 99.8 mol percent $(CH_3)_2SiO$ units and 0.2 mol percent $CH_2=CH(CH_3)SiO$ units having a viscosity at 25° C. of 5,000,000 cs., 45 parts of fume silica, 0.7 part of 2,4-dichlorobenzoyl peroxide and 5 parts of the paste. The silicone rubber stock was extruded to form a tape 1.5 cm. wide and 0.8 mm. thick. The tape was vulcanized at atmospheric pressure and at 200° C. for one minute. The tape so prepared was wound in a roll and stored at room temperature. After 6 months' storage the tape layers did not adhere to each other and the tape was easily unrolled. The tape was wound on an electrical conductor in standard fashion employing a half-width overlap. The tape adhered completely after heating the tape wound conductor for 2 hours at 100° C.

*Example 2*

Equivalent silicone rubbers were obtained when the method of Example 1 was followed employing 100 parts of any of the following siloxane polymers in place of the copolymer of Example 1; dimethylsiloxane polymer, viscosity 250,000 cs. at 25° C.; 3,3,3-trifluoropropylmethylsiloxane polymer, viscosity of 100,000 cs. at 25° C.; a copolymeric gum containing 50 mol percent dimethylsiloxane units and 50 mol percent phenylmethylsiloxane units; a hydroxyl-endblocked dimethylsiloxane gum; a dimethylvinylsilyl endblocked copolymer of 90 mol percent dimethylsiloxane units, 9 mol percent of diethylsiloxane units and 1 mol percent diphenylsiloxane units; and a cyanopropylmethylsiloxane.

*Example 3*

Equivalent silicone rubbers are obtained when equivalent amounts of any of the following are employed in place of the boric acid-glycerine-fume silica paste of Example 1: equimolar mixtures of boric acid with pentaerythritol, erythritol, ethylene glycol, propylene glycol, hexamethylene glycol, trimethylol propane, D-mannitol, sorbitol or menthol, with or without the fume silica.

*Example 4*

Excellent silicone rubber tapes which were self-adhering only at temperatures exceeding 60° C. were prepared from silicone rubber stocks obtained by admixing 100 parts of hydroxyl-endblocked dimethylsiloxane, viscosity 100,000 cs. at 25° C., 60 parts fume silica, .5 to 10 parts of a cross-linking agent selected from methyl hydrogensiloxane of 5–50 cs. at 25° C., tetraethoxy silane or ethyl polysilicate, and .1 to 5 parts of catalyst selected from lead octoate, dibutyl tin dilaurate, tin octoate, iron naphthenate, and other monocarboxylic acid states of Sn, Ti, and Zr. The stocks so prepared were formed into tapes and vulcanized at room temperature.

*Example 5*

Equivalent results were achieved when the fume silica in Example 1 was replaced by an equivalent amount of titanium dioxide, diatomaceous earth, ground quartz, powdered glass, polytetrafluoroethylene, and the vulcanizing agent is benzoyl peroxide, dicumyl peroxide, tertiary butyl perbenzoate or ditertiary butyl peroxide.

That which is claimed is:

1. A silicone rubber stock consisting essentially of 100 parts by weight of a siloxane polymer of general unit formula $$R_nSiO_{\frac{4-n}{2}}$$

where each R is a monovalent radical selected from the group consisting of hydrocarbon radicals and halogenohydrocarbon radicals and $n$ has an average value of from 1.99 to 2.01, said polymer having a viscosity of at least 50,000 cs. at 25° C., 0.1 to 10 parts by weight of a complex compound of boric acid and a polyhydric alcohol, and a finely divided filler.

2. The stock of claim 1 further characterized in that the filler is a fume silica and the stock contains .1 to 10 parts by weight of a diorganoperoxide vulcanizing agent.

3. The stock of claim 1 further characterized in that the siloxane polymer is hydroxyl endblocked, the filler is a silica and the stock contains .5 to 10 parts by weight of cross-linking agent selected from the group consisting of alkylhydrogensiloxanes, alkylsilicate and alkylpolysilicate, and .1 to 5 parts by weight of a metal salt of monocarboxylic acid wherein the metal ion is selected from the group consisting of Pb, Sn, Ni, Co, Fe, Cd, Cr, Mn, Zn, Zr, Sb, Ba, Ca, Ti, and Bi.

References Cited in the file of this patent

UNITED STATES PATENTS

| | | |
|---|---|---|
| 2,842,521 | Nitzsche et al. | July 8, 1958 |
| 2,983,697 | Brown et al. | May 9, 1961 |

FOREIGN PATENTS

| | | |
|---|---|---|
| 216,878 | Australia | Aug. 29, 1958 |
| 1,204,897 | France | Aug. 10, 1959 |

UNITED STATES PATENT OFFICE
CERTIFICATE OF CORRECTION

Patent No. 3,070,567                          December 25, 1962

Siegfried Nitzsche et al.

It is hereby certified that error appears in the above numbered patent requiring correction and that the said Letters Patent should read as corrected below.

Column 2, line 42, after "soluble" insert -- high --.

Signed and sealed this 10th day of November 1964.

(SEAL)
Attest:

ERNEST W. SWIDER
Attesting Officer

EDWARD J. BRENNER
Commissioner of Patents